United States Patent [19]
Ladd

[11] Patent Number: 5,991,370
[45] Date of Patent: Nov. 23, 1999

[54] VOICE MESSAGING SYSTEM AND METHOD PROVIDING MESSAGE DELIVERY VERIFICATION

[75] Inventor: David J. Ladd, Saratoga, Calif.

[73] Assignee: Lucent Technologies Inc., Murray Hill, N.J.

[21] Appl. No.: 08/896,595

[22] Filed: Jul. 18, 1997

[51] Int. Cl.[6] ................................................... H04M 1/64
[52] U.S. Cl. ........................ 379/88.25; 379/85; 379/88.12
[58] Field of Search ............................... 379/67.1, 88.08, 379/88.09, 88.1, 88.12, 88.22, 88.23, 88.24, 88.25, 88.26, 69, 70, 77, 80, 85

[56] References Cited

U.S. PATENT DOCUMENTS 4,625,081  11/1986  Lotito et al. ............................ 379/211
5,241,584  8/1993  Hardy et al. ............................ 379/113
5,333,180  7/1994  Brown et al. ............................ 379/79

*Primary Examiner*—Fan S. Tsang

[57] ABSTRACT

A verifying non-user outcall unit within a voice messaging system attempts to deliver a subscriber's message to a non-subscriber. During the delivery attempt, the verifying non-user outcall unit directs the recording of a signal returned after dialing a recipient's telephone number. The verifying non-user outcall unit analyzes the signal returned, and determines whether the delivery attempt is successful. If the delivery attempt is unsuccessful, the verifying non-user outcall unit stores the recorded signal and a nondelivery notification in the originating subscriber's mailbox. If the delivery attempt is successful, the verifying non-user outcall unit stores a voice signal recorded after the recipient telephone is answered and a delivery notification in the originating subscriber's mailbox.

26 Claims, 7 Drawing Sheets

VOICE MESSAGING SYSTEM AND METHOD PROVIDING MESSAGE DELIVERY VERIFICATION

CROSS-REFERENCE TO RELATED PUBLICATIONS

The present invention relates to U.S. Pat. No. 5,557,659, entitled "Electronic Mail System Having Integrated Voice Messages," which is incorporated herein by reference.

BACKGROUND OF THE INVENTION

1.1 Field of the Invention

The present invention relates generally to voice messaging systems, and more particularly to voice messaging systems capable of non-user outcall operation. Still more particularly, the present invention is a voice messaging system and method for automatically providing verification information pertaining to message delivery.

1.2 Description of the Background Art

Voice messaging systems have become well-known in recent years. In general, such systems have two distinct uses. A first use is to act like an answering machine, automatically answering a telephone call in the event that an intended call recipient cannot. This type of system operation enables a caller to leave a message, and further provides means by which the intended recipient can subsequently retrieve, listen to, and selectively discard messages.

A second use is that of a messaging system, in which the system enables users, or subscribers, to create and distribute messages to groups of other known subscribers. The messaging system creates a database directory with a unique numerically-addressed mailbox for each subscriber, where the numeric address is typically the subscriber's telephone number. The system enables a subscriber to call into the system, log into his or her own mailbox, create and send messages directed to other subscribers' mailboxes, reply to messages, and forward messages with comments. With messaging systems, there is no need for a subscriber to actually place a telephone call to another subscriber when message delivery is required. Each subscriber must, however, log into their mailbox from time to time to retrieve and listen to messages.

In the prior art, typical messaging systems facilitate messaging only between the users identified within the database directory, that is, between subscribers. Some messaging systems, such as that described in U.S. Pat. No. 4,585,906, implement a feature commonly referred to as "non-user outcalling." A messaging system supporting non-user outcalling enables a subscriber to specify either mailbox numbers or non-users' telephone numbers as the addresses to which a message is to be delivered. Such systems deliver a message to a non-user by automatically calling the specified telephone number. If the call is answered, the messaging system plays the message and may further allow the call recipient to record a reply, which is returned to the originating subscriber's mailbox. In the event that there was no answer or the line was busy, non-user outcalling systems typically make repeated attempts to deliver the message. Following a certain number of unsuccessful message delivery attempts, the system returns the message to the originating subscriber's mailbox with a notification of non-delivery. Some prior art non-user outcalling systems are additionally capable of delivering a message to an answering machine or another messaging system operating in an answering machine mode.

Prior art voice messaging systems that implement non-user outcalling, however, suffer from a significant drawback because a message originator can't be sure that a message has been delivered to the correct recipient or destination. For example, a child could answer the telephone, or a wrong telephone number may have been entered and the message could have been left with the wrong person or on the wrong answering machine. Additionally, even systems that provide non-delivery notification fail to provide an indication as to why a message could not be delivered, such as an invalid telephone number or a busy signal during each delivery attempt. What is needed is a system and method that provides message originators with detailed message delivery information.

SUMMARY OF THE INVENTION

The present invention is a voice messaging system and method providing message delivery verification. The system of the present invention preferably comprises a Voice Messaging System (VMS) capable of delivering subscribers' messages to non-subscribers or non-users, and having a verifying non-user outcall unit and a verifying message inquiry unit. Each of the verifying non-user outcall unit and verifying message inquiry unit preferably comprise a sequence of program instructions executable by a processing unit, for directing the operation of hardware and/or software elements within the VMS to perform the operations described hereafter.

During non-user outcall operations that attempt to deliver a subscriber's message to a target non-user, the verifying non-user outcall unit initiates the recording of a telephone signal returned after dialing the non-user's telephone number. The recorded signal may be a busy signal; a ringback signal; a voice signal corresponding to a person or answering machine; or any other type of signal that might be received after a telephone number is dialed, such as a prerecorded message indicating a disconnected or changed telephone number.

The verifying non-user outcall unit subsequently determines what type of signal is returned on the telephone line. If the returned signal is neither a ringback signal, a voice signal, nor a busy signal, the verifying non-user outcall unit terminates the recording after a minimum recording time, and returns the recorded signal, the subscriber's message, and a nondelivery notification to the subscriber's mailbox. In response to a busy signal, or a ringback signal that has not been answered after a ringback time limit, the verifying non-user outcall unit stops recording after the minimum recording time, and initiates another delivery attempt in the event that a maximum number of busy or ringback attempts has not been exceeded, respectively. In the event that the message could not be delivered after the maximum number of busy or ringback retry attempts, the verifying non-user outcall unit returns the recorded signal, the original message, and a nondelivery notification to the subscriber's mailbox.

Upon detecting a voice signal, the verifying non-user outcall unit waits for a silence interval (preferably about 2 seconds), and then stops recording the voice signal. The silence interval is taken to indicate that a person who has answered the phone has stopped speaking, or an answering machine has completed its greeting. The verifying non-user outcall unit next delivers the subscriber's message. Finally, the verifying non-user outcall unit returns the recorded voice signal, the subscriber's message, and a delivery notification to the originating subscriber's mailbox.

During message inquiry operations performed after a subscriber has logged into their mailbox, for each of the subscriber's messages the verifying non-user outcall unit delivered, the verifying message inquiry unit plays a delivery prompt, followed by the recorded voice signal associated with the message. The verifying message inquiry unit then plays an original message prompt, followed by the subscriber's original message itself. Similarly, for each message that the verifying non-user outcall unit did not deliver, the verifying message inquiry unit plays a nondelivery prompt, and then plays the signal that was recorded during the delivery attempt. The verifying message inquiry unit next plays the original message prompt and the original message. The verifying message inquiry unit additionally provides notification management operations in response to subscriber commands, thereby facilitating notification and original message deletion; notification forwarding, with or without original message; and notification archival, with or without original message. The verifying message inquiry unit also provides conventional VMS operations in response to subscriber commands, such as skip-to-end, speed-up or slow-down playback, or skip-entirely.

By recording the signal returned during non-user outcall operations, storing the recorded signal in a subscriber's mailbox, and playing the recorded signal back to the subscriber, the present invention provides the VMS subscriber with detailed information for verifying whether a message was delivered to the correct party, and further provides explicatory information when a message was not delivered.

DETAILED DESCRIPTION OF THE PREFERRED EMBODIMENTS

Figure 1:
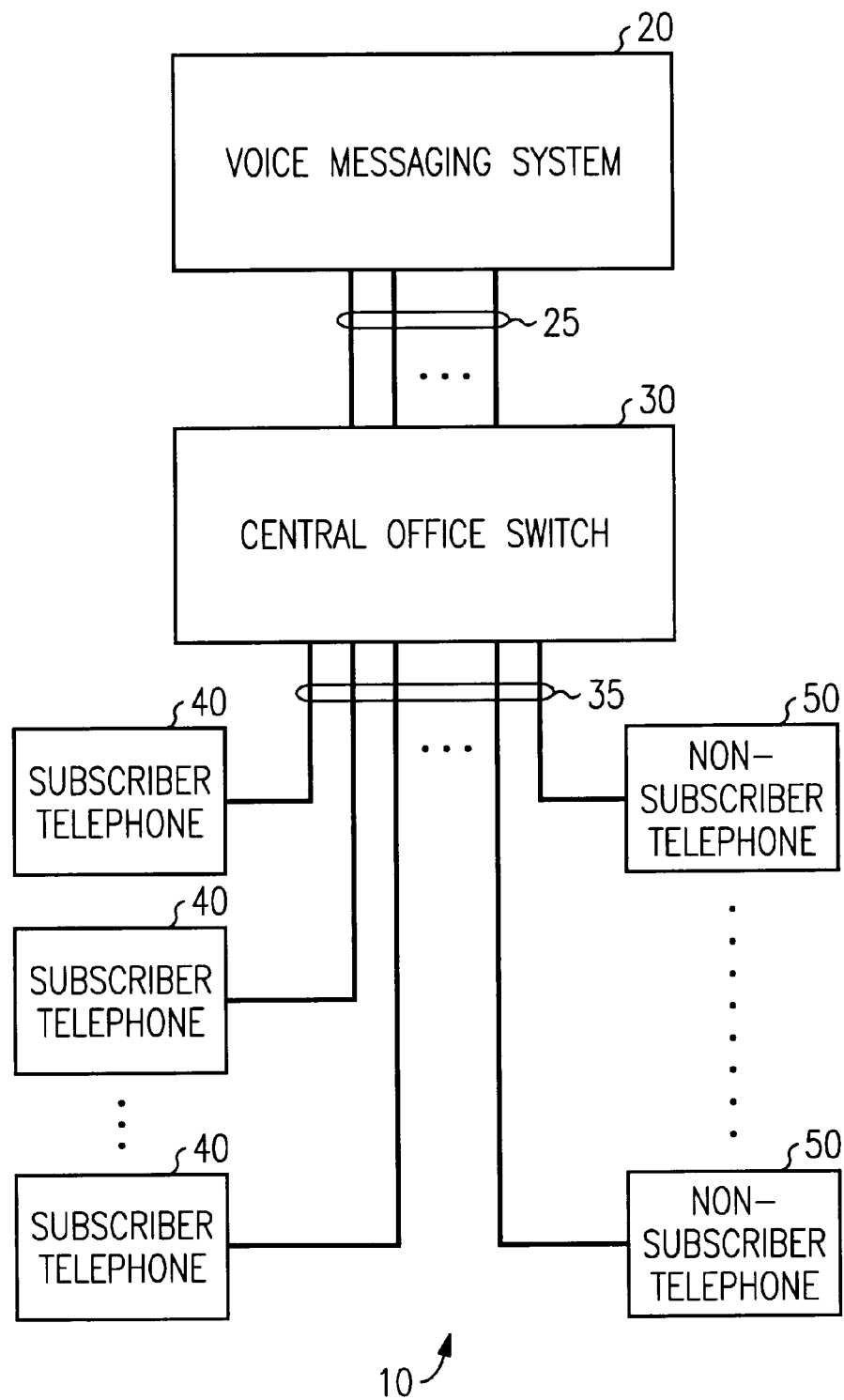
FIG. 1 is a block diagram of a first exemplary voice messaging environment in which the present invention functions.

Referring now to FIG. 1, a block diagram of a first exemplary voice messaging environment 10 employing the present invention is shown. The first voice messaging environment 10 comprises a first Voice Messaging System (VMS) 20 constructed in accordance with the present invention, a Central Office (CO) switch 30, one or more subscriber telephones 40, and at least one non-subscriber, or non-user, telephone 50. A first set of lines 25 couple the first VMS 20 to the central office switch 30 in a conventional manner. Similarly, a second set of lines 35 conventionally couple each of the subscriber and non-subscriber telephones 40, 50 to the CO switch 30.

In the present invention, the term "subscriber" refers to a given user for whom the first VMS 20 provides voice messaging services, such as voice mail, message store-and-forward, and message distribution, plus the message delivery verification operations described in detail below. The first VMS 20 preferably maintains a database directory entry and a mailbox for each subscriber in a conventional manner. The terms "non-subscriber" and "non-user" refer to a telephone system user having no direct access to services provided by the first VMS 20.

The CO switch 30 comprises a conventional telephone system switch that selectively couples individual subscriber telephones 40, non-user telephones 50, and the first VMS 20 in a manner readily understood by those skilled in the art. Those skilled in the art will additionally recognize that the teachings of the present invention are equally applicable to messaging environments in which the subscriber and non-user telephones 40, 50 are coupled to a first CO switch 30, while the first VMS 20 is coupled to a second CO switch 30 that itself is coupled to the first CO switch 30; or environments in which the first VMS 20 and subscriber telephones 40 are coupled to a Private Branch Exchange (PBX), while the PBX and non-user telephones 50 are coupled to a CO switch 30; or essentially any messaging environment reflecting a telephone system organization in which the first VMS 20 is employed with at least one subscriber telephone 40, a set of non-user telephones 50, and one or more types of switches used to selectively route telephone signals. The first exemplary messaging environment 10 shown in FIG. 1 provides a simple and clear illustration of one manner in which the present invention may be employed.

Figure 2:
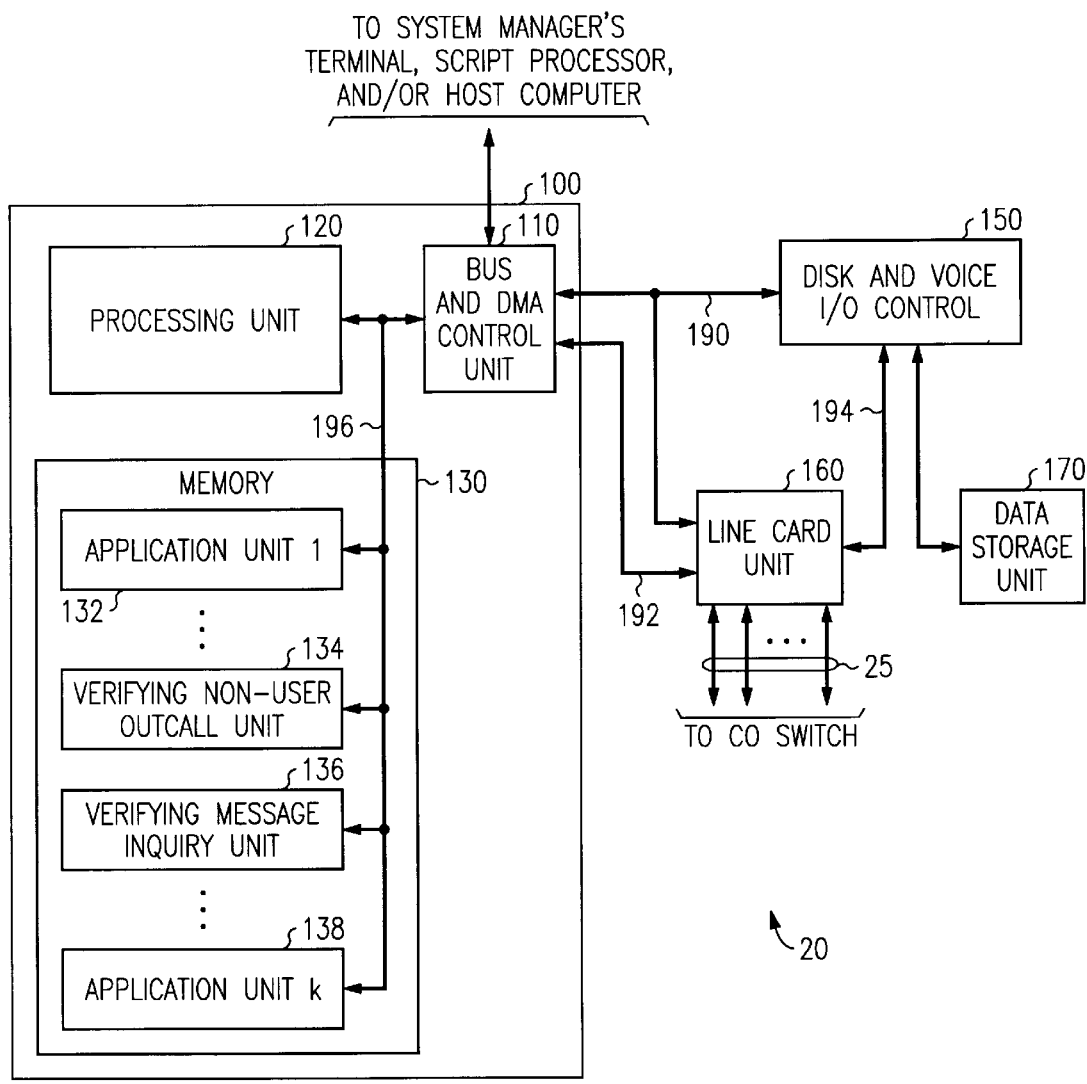
FIG. 2 is a block diagram of a preferred embodiment of a Voice Messaging System providing message delivery verification.

Referring also now to FIG. 2, a block diagram of a preferred embodiment of the first VMS 20 constructed in accordance with the present invention is shown. The first VMS 20 comprises a system control unit 100, a disk and voice I/O control unit 150, a line card unit 160, and a data storage unit 170 within which the aforementioned subscriber database directory and mailboxes reside. The elements of the first VMS 20 are selectively coupled via a control bus 190, a data bus 192, and a line card bus 194 in a conventional manner. In the preferred embodiment, each of the disk and voice I/O control unit 150, the line card unit 160, and the data storage unit 170 are conventional. Those skilled in the art will recognize that the first VMS 20 could include other conventional elements, such as a fax unit.

The system control unit 100 comprises a Bus and Direct Memory Access (DMA) control unit 110, a processing unit 120, and a memory 130, each of which is coupled via a common bus 196. A plurality of application units 132, 134, 136, 138 reside within the memory 130. Each application unit 132, 134, 136, 138 preferably comprises a sequence of program instructions that provides one or more VMS operations or controls the operation of one or more elements within the first VMS 20 when executed by the processing unit 120. The first VMS 20 includes conventional application units 132, 138 for directing operations such as automated attendant services, message addressing, message storage and forwarding, and mailbox administration. The first VMS 20 additionally includes a verifying non-user outcall unit 134 and a verifying message inquiry unit 136 that perform the present invention's message delivery verification operations, as described in detail below with reference to FIGS. 3A, 3B, and 4. In an exemplary embodiment, the first VMS 20 is an Octel Sierra system (Octel Communications Corporation, Milpitas, Calif.) having the verifying non-user outcall unit 134 and the verifying message inquiry unit 136 described herein.

In an alternate embodiment, the first VMS 20 could be implemented by employing the verifying non-user outcall and verifying message inquiry units 134, 136 in either an integrated or unified messaging system. U.S. Pat. No. 5,557,659, entitled "Electronic Mail System Having Integrated Voice Messages," describes a preferred unified messaging system, and is incorporated herein by reference. Relative to FIG. 1 of U.S. Pat. No. 5,557,659, the first VMS 20 would comprise a voice gateway computer coupled to subscriber and non-subscriber telephones 40, 50 via a PBX, and further coupled to exchange messages with a computer network. The verifying non-user outcall unit 134 and verifying message inquiry unit 136 would reside within the voice gateway computer's memory. The manner in which these elements could be incorporated into similar unified or integrated messaging systems will be readily understood by those skilled in the art.

In the description that immediately follows, it is assumed that a subscriber has logged into his or her mailbox and recorded a message addressed to a target non-user, in accordance with conventional voice messaging procedures. The first VMS 20 subsequently initiates non-user outcalling operations under the direction of the verifying non-user outcall unit 134.

Figure 3A:
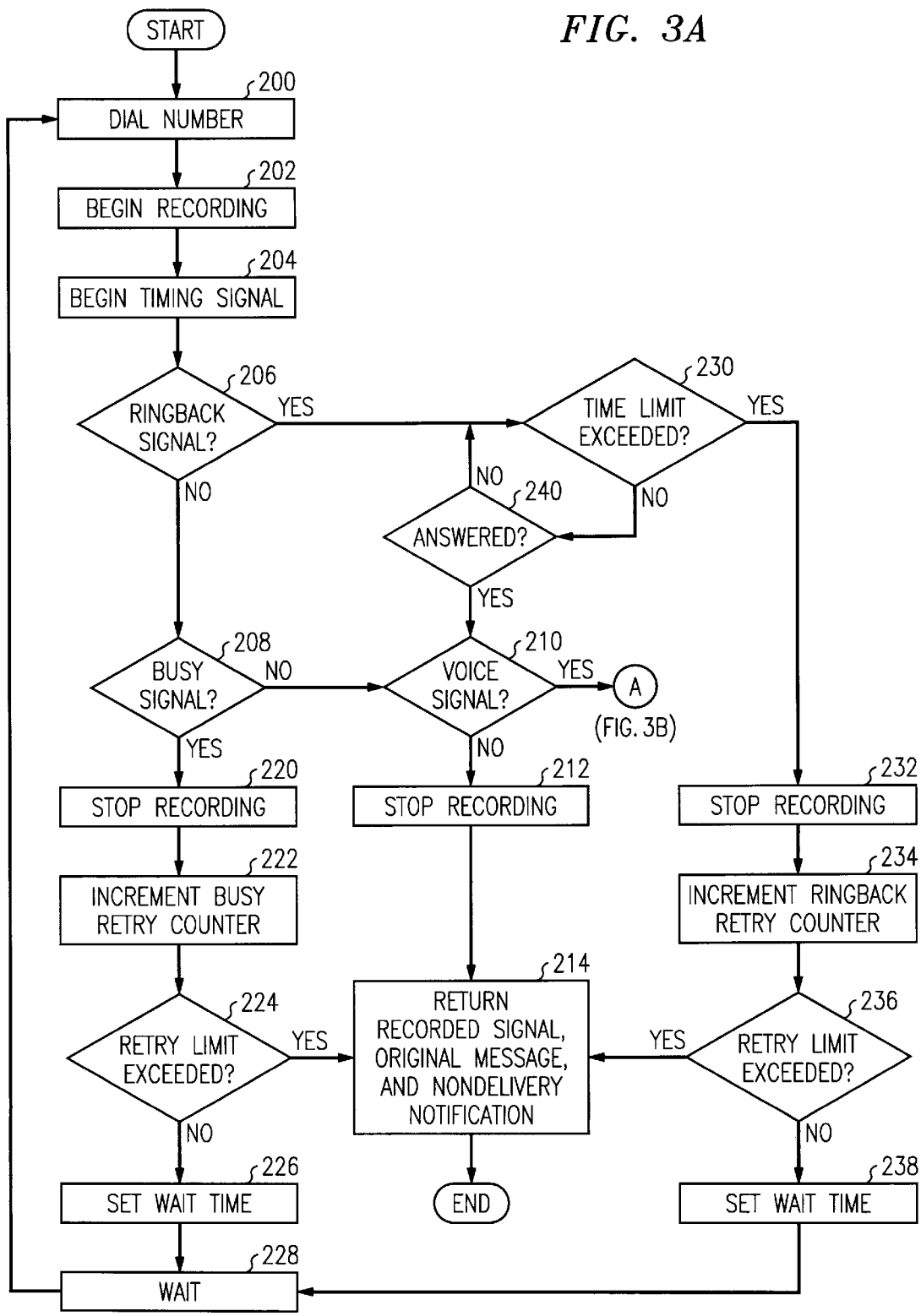
FIGS. 3A and 3B are a flowchart of a preferred method for providing message delivery verification during non-user outcall operations.
Figure 3B:
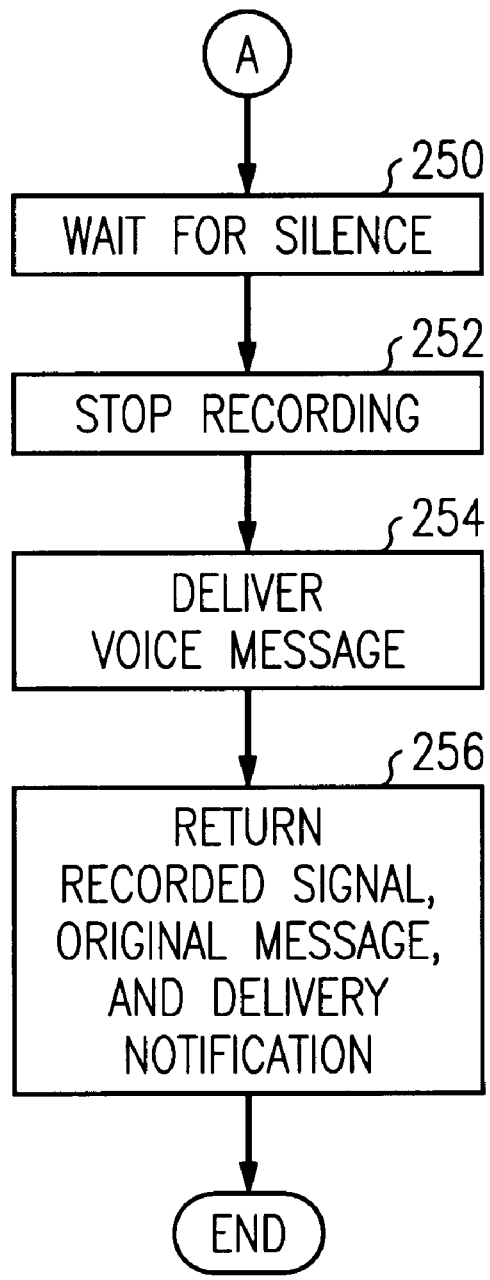

Referring now to FIGS. 3A and 3B, a flowchart of a preferred method for providing message delivery verification during non-user outcall operations is shown. The preferred method begins in step 200 with the verifying non-user outcall unit 134 establishing a connection to an available telephone line and dialing the target non-user's telephone number. The verifying non-user outcall unit 134 next begins recording the signal returned on the telephone line in step 202. In the preferred embodiment, step 202 is initiated essentially immediately after, or very shortly after, dialing is completed. Following step 202, the verifying non-user outcall unit 134 begins timing the returned signal in step 204. Next, the verifying non-user outcall unit 134 determines whether the returned signal is a ringback signal in step 206. If a ringback signal is not detected, the verifying non-user outcall unit 134 determines in step 208 whether the returned signal is a busy signal. If a busy signal is not detected, the verifying non-user outcall unit 134 subsequently determines whether the returned signal is a voice signal in step 210. If the returned signal is not a voice signal, the verifying non-user outcall unit 134 stops recording the returned signal after a minimum recording time in step 212. In the preferred embodiment, the minimum recording time is predetermined, and selected to ensure that the recorded signal will convey an adequate amount of information when played back to the originating subscriber. In an exemplary embodiment, the minimum recording time is 5 seconds. The determinations of whether the returned signal is a ringback, busy, or voice signal are preferably performed in a conventional manner. Those skilled in the art will recognize that standard voice processing hardware, such as voice boards produced by Rhetorex Corporation of San Jose, Calif., includes built-in capabilities for determining the type of signal returned on a telephone line.

The verifying non-user outcall unit 134 next stores the original message, a nondelivery notification, and the recording of the returned signal in the originating subscriber's mailbox in step 214. In the preferred embodiment, the verifying non-user outcall unit 134 truncates the recorded signal prior to storing it in the subscriber's mailbox in the event that its duration exceeds a maximum nondelivery recording time limit. An exemplary maximum nondelivery recording time limit is 10 seconds. Following step 214, the preferred method ends.

In the event that a busy signal is detected in step 208, the verifying non-user outcall unit 134 stops recording the returned signal after the minimum recording time in step 220, and then increments a busy retry counter in step 222. Next, the verifying non-user outcall unit 134 determines whether a busy retry limit has been exceeded in step 224. In the event that the busy retry limit has been exceeded, the preferred method proceeds to step 214. Otherwise, the verifying non-user outcall unit 134 sets a busy wait time in step 226, and then temporarily interrupts the current set of non-user outcall operations for the duration of the busy wait time in step 228. Of course, during step 228, the first VMS 20 can perform other operations. Following step 228, the preferred method returns to step 200.

In the event that a ringback signal is detected in step 206, the verifying non-user outcall unit 134 determines in step 230 whether a ringback time limit has been exceeded. If so, the verifying non-user outcall unit 134 stops recording the returned signal and truncates the recording such that its duration is less than or equal to the maximum nondelivery recording time limit in step 232. The verifying non-user outcall unit 134 then increments a ringback retry counter in step 234, and determines in step 236 whether a ringback retry limit has been exceeded. In the event that the ringback retry limit has been exceeded, the preferred method proceeds to step 214. Otherwise, the verifying non-user outcall unit 134 sets a ringback wait time in step 238. The preferred method then proceeds to step 228, thereby temporarily interrupting the current set of non-user outcall operations until the ringback wait time has elapsed.

If in step 230 the ringback time limit has not been exceeded, the verifying non-user outcall unit 134 determines whether the telephone call has been answered in step 240. Preferably, the verifying non-user outcall unit 134 makes this determination by monitoring for a cessation of the ringback signal, followed by the presence of a voice signal detected in a conventional manner. If the telephone call has not been answered, the preferred method returns to step 230. Upon determining in step 240 that the telephone call has been answered, the verifying non-user outcall unit 134 proceeds to step 210.

In the event that a voice signal is detected in step 210, the verifying non-user outcall unit 134 proceeds to step 250 and waits until a predetermined silence interval has elapsed. Those skilled in the art will recognize that the presence of a sufficiently long silence interval following a voice signal can indicate either a human waiting for a response or an answering machine that has begun recording after playing a greeting. An exemplary silence interval is 2 seconds. Following the predetermined silence interval, the verifying non-user outcall unit 134 stops recording the returned signal in step 252, and then delivers the subscriber's message in step 254. Finally, the verifying non-user outcall unit 134 stores the original message, a delivery notification, and the voice signal recorded after the telephone call was answered in the originating subscriber's mailbox in step 256. Upon completion of step 256, the preferred method ends.

In the preferred embodiment, each signal-type determination step 206, 208, 210, 240 is performed in accordance with well-known techniques. Additionally, the busy retry limit, the busy wait time, the ringback time limit, the ringback retry limit, and the ringback wait time are predetermined, each specified such that message delivery is likely within a reasonable amount of time. In an exemplary embodiment, the busy retry limit is 10 attempts, the busy wait time is 5 minutes, the ringback time limit is 45 seconds, the ringback retry limit is 5 attempts, and the ringback wait time is 30 minutes. Those skilled in the art will recognize that the steps described in FIGS. 3A and 3B are repeated for each non-user to whom a subscriber has addressed a message.

The first VMS 20 enables subscribers to log into their mailboxes and request voice messaging services in a conventional manner. In the preferred embodiment, in response to a subscriber's issuance of a command indicating that message inquiry functions are required, the verifying message inquiry unit 136 plays any stored voice messages directed to the subscriber in a conventional manner, and subsequently performs the message delivery verification operations described hereafter.

Figure 4:
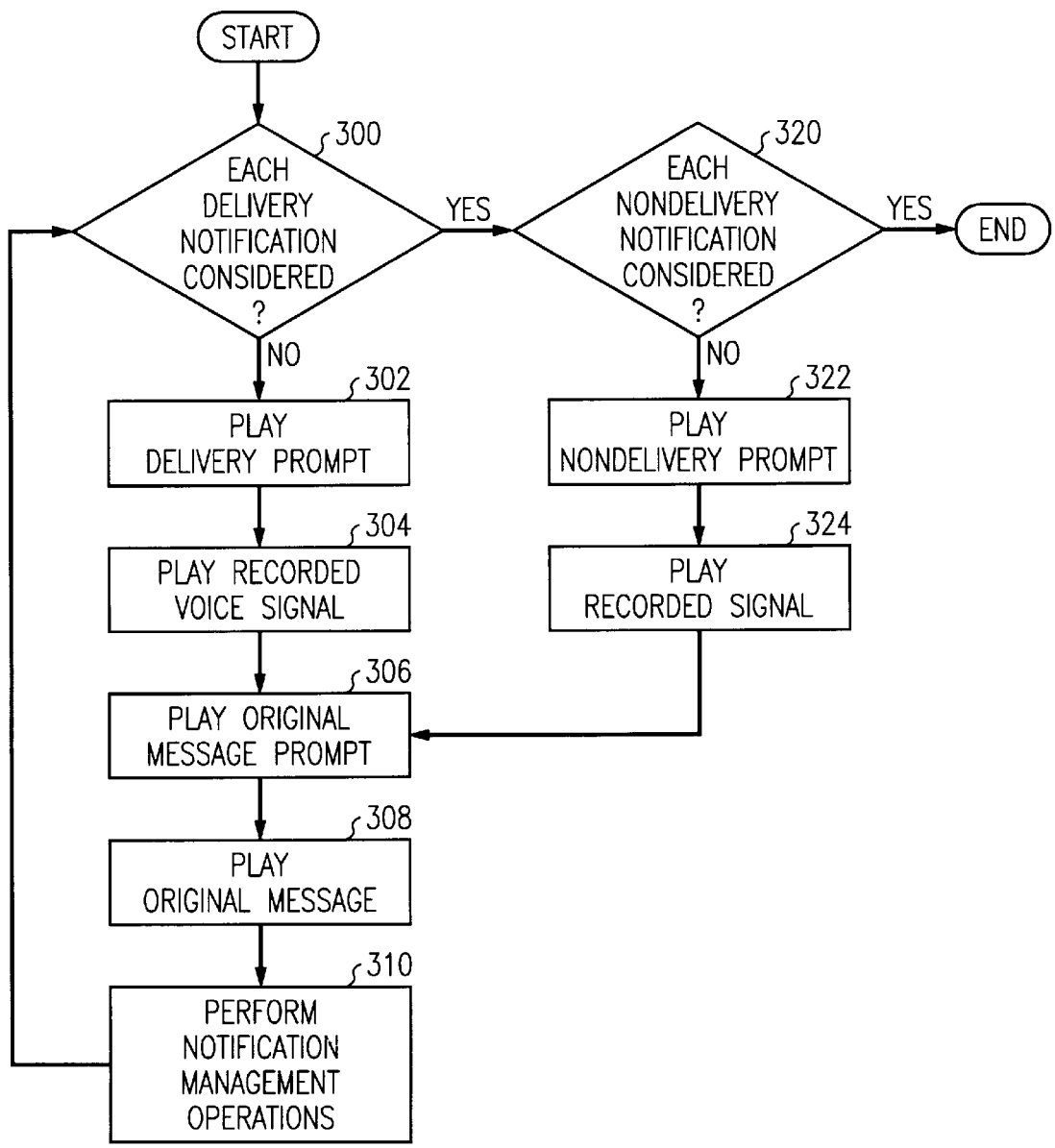
FIG. 4 is a flowchart of a preferred method for providing message delivery verification during message inquiry operations.

Referring now to FIG. 4, a flowchart of a preferred method for providing message delivery verification during message inquiry operations is shown. The preferred method begins in step 300 with the verifying message inquiry unit 136 determining whether each delivery notification within a subscriber's mailbox has been considered. If not, the verifying message inquiry unit 136 plays a delivery notification prompt in step 302, such as "Delivery notification: voice recorded was." Next, in step 304, the verifying message inquiry unit 136 plays the voice signal recorded during the non-user outcall operations described above in FIGS. 3A and 3B. The verifying message inquiry unit 136 then plays an original message prompt in step 306, which could be, for example, "your original message was." The verifying message inquiry unit 136 plays the subscriber's original message in step 308. The verifying message inquiry unit 136 subsequently provides the subscriber with notification management operations, such as notification and original message deletion; notification forwarding, with or without original message; and notification archival, with or without original message, in step 310. After step 310, the preferred method returns to step 300. For each delivery notification present within the subscriber's mailbox, the preferred method performs steps 300 through 310.

Once each delivery notification has been considered, or if no delivery notifications are present in step 300, the verifying message inquiry unit 136 determines whether each nondelivery notification within the subscriber's mailbox has been considered in step 320. If not, the verifying message inquiry unit 136 plays a nondelivery notification prompt in step 322, such as "your message could not be delivered; signal recorded after dialing was." Next, in step 324, the verifying message inquiry unit 136 plays the signal recorded during the non-user outcall operations described above. The preferred method then proceeds to step 306. Steps 320 through 324 plus steps 306 through 310 are repeated for each nondelivery notification present in the subscriber's mailbox. After considering each nondelivery notification in the subscriber's mailbox, or in the event that no nondelivery notifications are present in step 320, the preferred method ends.

In the preferred embodiment, the verifying message inquiry unit 136 supports standard voice messaging operations in response to subscriber commands, such as skip-to-end, speed-up or slow-down playback, or skip-entirely during the steps shown in FIG. 4. In response to a skip-to-end command, the preferred method proceeds to step 310. In response to a skip-entirely command, the preferred method proceeds to step 300.

Via the operations described in FIGS. 3A, 3B, and 4, the present invention provides subscribers with detailed information for verifying whether a message was delivered to the correct party, and further provides explicatory information when a message cannot be delivered. For example, the present invention provides a means by which a subscriber could verify that a message had not been delivered because a fax number was dialed.

In the preferred embodiment, the message delivery verification operations described herein can be activated or deactivated in response to a subscriber command. Provision for detection of such a command could exist, for example, within a subscriber preference settings menu in a manner that will be readily understood by those skilled in the art.

The teachings of the present invention can be applied to essentially any outcalling situation in which the availability of information recorded during message delivery may be useful. For example, such recorded information could be useful in voice messaging environments that include a Call Message Delivery (CMD) server.

Figure 5:
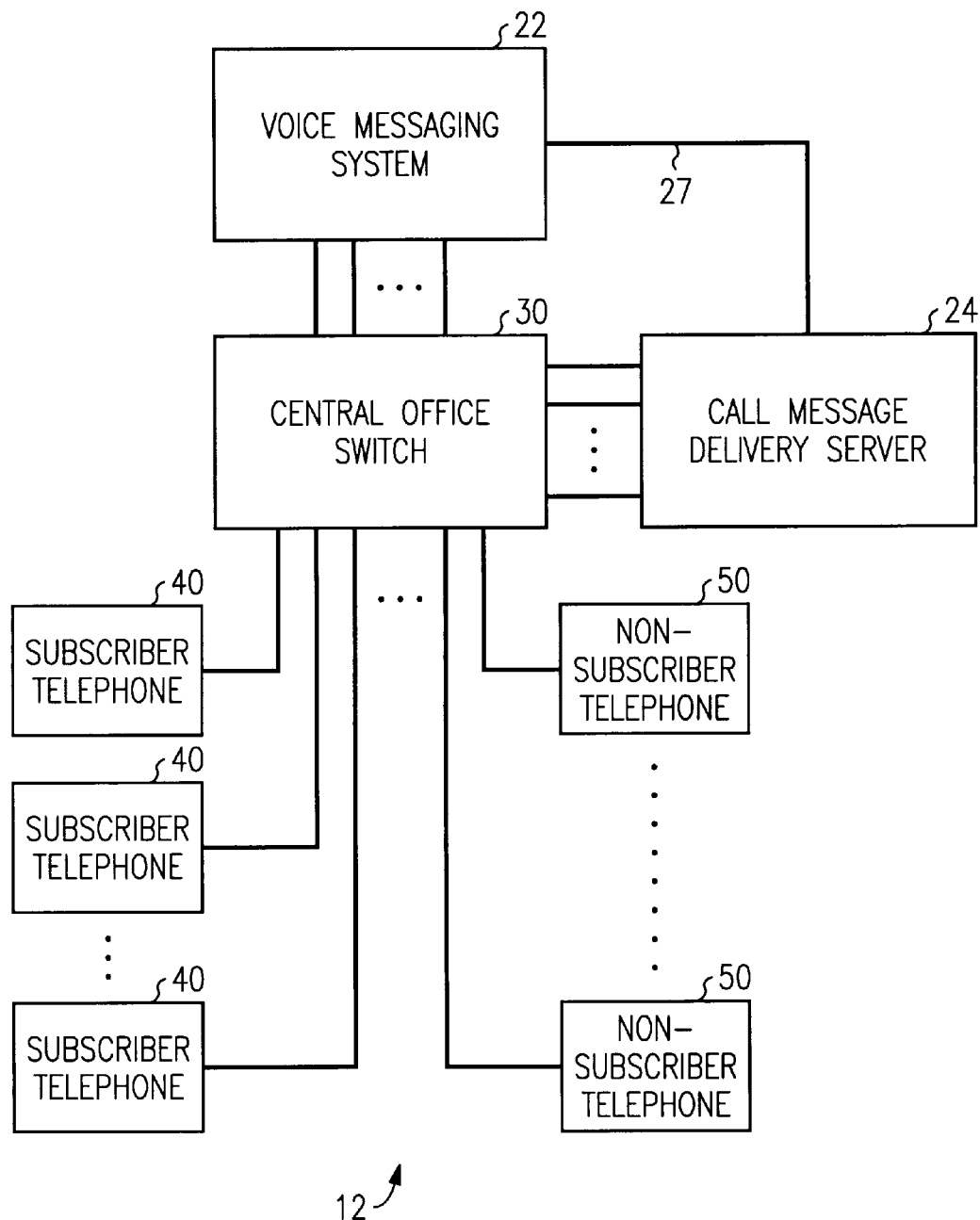
FIG. 5 is a block diagram of a second exemplary voice messaging environment in which the present invention functions.

Referring now to FIG. 5, a block diagram of a second exemplary voice messaging environment 12 employing the present invention is shown. To aid understanding, elements shown in FIG. 5 are numbered with reference to FIG. 1, and thus like elements have like reference numbers. In the second exemplary voice messaging environment 12, a second VMS 22 is coupled to a CO switch 30, which is further coupled to a set of subscriber telephones 40 and a set of nonsubscriber telephones 50 in the manner shown in FIG. 1. The second VMS 22 is also coupled to a CMD server 24 via a network line 27, and a set of telephone lines couple the CMD server 24 to the CO switch 30 in a conventional manner.

In the preferred embodiment, the second VMS 22 does not have non-user outcalling capabilities. That is, the second VMS 22 does not include the verifying non-user outcall unit 134 or the verifying message inquiry unit 136 within the first VMS 20 of FIGS. 1 and 2. Via the network line 27, the CMD server 24 provides the second VMS 22 with non-user outcalling capabilities, as described in detail below. In the preferred embodiment, the network line 27 comprises a conventional network coupling, such as an analog line through which information is exchanged in accordance with a protocol such as Audio Messaging Interchange Specification (AMIS) analog; or a digital coupling such as an Ethernet, serial line, or internet coupling, through which information is exchanged in accordance with a network protocol such as OctelNet or Voice Profile for Internet Mail (VPIM).

Those skilled in the art will recognize that multiple variations upon the second exemplary voice messaging environment 12 exist. For example, the subscriber and non-user telephones 40, 50 could be coupled to a first CO switch 30, while the second VMS 22 and the CMD server 24 are coupled to a second CO switch 30 that itself is coupled to the first CO switch 30; or the second VMS 22 and the subscriber telephones 40 could be coupled to a PBX, while the non-user telephones 40 and the CMD server 24 are coupled to a CO switch 30, where the second VMS 22 and the CMD server 24 are coupled via the network line 27.

Figure 6:
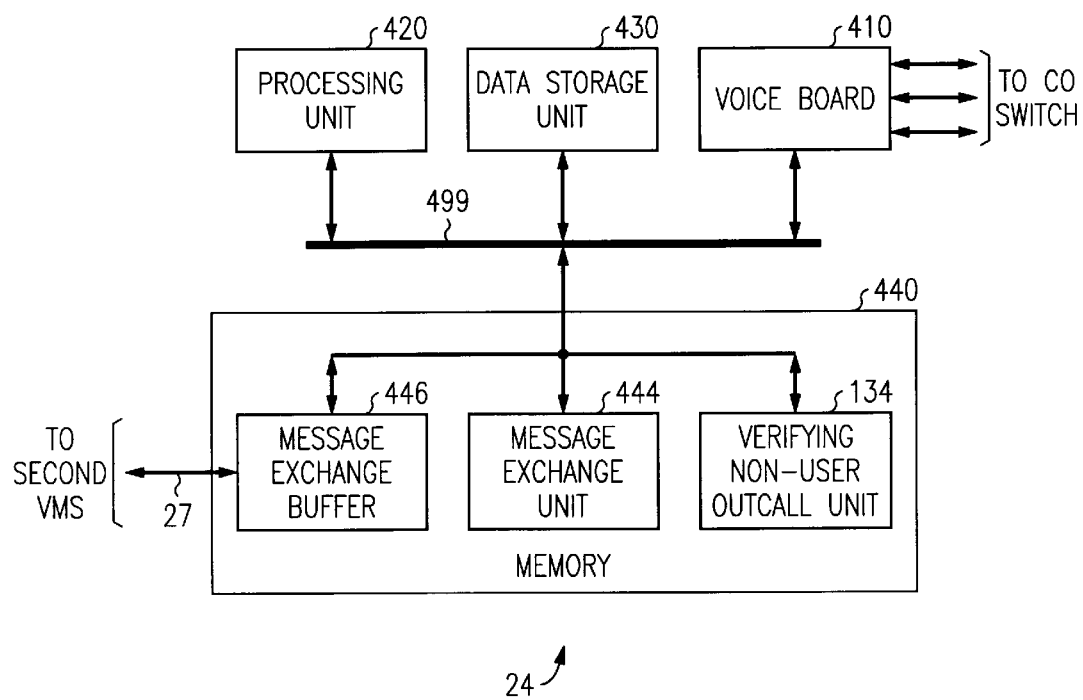
FIG. 6 is a block diagram of a preferred embodiment of a Call Message Delivery server providing message delivery verification.

Referring also now to FIG. 6, a block diagram of a preferred embodiment of a Call Message Delivery server 24 constructed in accordance with the present invention is shown. Elements in FIG. 6 are numbered with reference to FIG. 2, and thus like elements have like reference numbers. The CMD server 24 preferably comprises a personal computer having a voice board 410, a processing unit 420, a data storage device 430 and a memory 440 wherein a verifying non-user outcall unit 134, a message exchange unit 444, and a message exchange buffer 446 reside. Each element of the CMD server 24 is coupled via a common bus 499. The message exchange buffer 446 is coupled to the second VMS 22, and the voice board 410 is coupled to the CO switch 30.

The message exchange unit 444 manages the transfer of commands, messages, and delivery and nondelivery notifications between the message exchange buffer 446 and the second VMS 22. In response to an outcall request received from the second VMS 22 specifying a message plus a telephone number, the message exchange unit 444 transfers control to the verifying non-user outcall unit 134.

The verifying non-user outcall unit 134 within the CMD server 24 records message delivery verification information by performing the steps indicated in FIGS. 3A and 3B. When performing step 214 of FIG. 3A, in which nondelivery verification information is returned to the originating subscriber's mailbox, the verifying non-user outcall unit 134 preferably stores the recorded signal in the message exchange buffer 446, and notifies the message exchange unit 444 that nondelivery verification information is to be returned. In response, the message exchange unit 444 associates a set of prompts with the original message, in a manner consistent with the network protocol in use. Preferably, the associated prompts include 1) a nondelivery phrase, such as "your message could not be delivered; signal recorded after dialing was"; 2) the recorded signal itself; and 3) an original message phrase, such as "your original message was." The message exchange unit 444 then transfers the set of prompts and the original message to the second VMS 22.

In embodiments in which the network protocol has limited nondelivery notification support or prompt association provisions, the message exchange unit 444 creates a new composite message that preferably comprises 1) a nondelivery phrase; 2) the recorded signal; 3) an original message phrase; and 4) the original message. The message exchange unit 444 subsequently transfers the composite message to the second VMS 22. Either of the above approaches for returning nondelivery verification information to the originating subscriber's mailbox provides the message originator with detailed message nondelivery information through conventional message inquiry operations, thereby overcoming the absence of a verifying message inquiry unit 136 within the second VMS 22.

When performing step 256 of FIG. 3B, in which delivery verification information is returned to the originating subscriber's mailbox, the verifying non-user outcall unit 134 and the message exchange unit 444 perform steps analogous to those described above for providing nondelivery verifictation information. That is, a set of delivery prompts that includes the voice signal recorded during non-user outcall operations is associated with the original message; or a composite message is created, which includes delivery phrases, the recorded voice signal, plus the subscriber's original message.

In the preferred embodiment, the verifying non-user outcall unit 134 and the message exchange unit 444 comprise program instruction sequences that are executable by the processing unit 420. In an exemplary embodiment, the CMD server 24 comprises a personal computer having a 200 MHz Pentium processor (Intel Corporation, Santa Clara, Calif.), a 4 gigabyte hard disk drive, a Rhetorex voice processing board (Rhetorex Corporation, San Jose, Calif.), and 64 megabytes of Random Access Memory (RAM) wherein the verifying non-user outcall unit 134 the message exchange unit 444, and the message exchange buffer 446 reside. In the exemplary embodiment, the CMD server 24 is coupled to the second VMS 22 via an Ethernet link.

While the present invention has been described with reference to certain preferred embodiments, those skilled in the art will recognize that various modifications can be provided. For example, the verifying non-user outcall unit could store a recorded telephone signal in multiple subscribers' mailboxes in response to a directive issued by the originating subscriber. The description herein provides for this and other variations upon the present invention, which is limited only by the following claims.

What is claimed is:

1. In a messaging system providing voice messaging services to a subscriber, a method for providing delivery verification information when a message is to be delivered to a nonsubscriber, the method comprising the steps of:

dialing a telephone number associated with the nonsubscriber;

recording a signal returned after dialing wherein the recording step begins essentially immediately after the dialing step; and storing the recording of the returned signal in a mailbox associated with the subscriber.

2. The method of claim 1, further comprising the step of determining whether the returned signal corresponds to a voice signal.

3. The method of claim 2, further comprising the step of storing a delivery notification in the mailbox.

4. The method of claim 2, further comprising the step of storing a nondelivery notification in the mailbox.

5. The method of claim 1, further comprising the steps of:

determining whether the returned signal is one from a group of a busy signal and a ringback signal; and repeating the dialing and recording steps after a predetermined wait time.

6. The method of claim 1, further comprising the steps of:

delivering the message to the nonsubscriber; and storing the message in the mailbox in conjunction with storage of the recording of the returned signal.

7. The method of claim 1, further comprising the step of playing the recording of the returned signal to the subscriber.

8. The method of claim 3, further comprising the steps of:

playing the delivery notification to the subscriber; and playing the recording of the returned signal to the subscriber.

9. The method of claim 4, further comprising the steps of:

playing the nondelivery notification to the subscriber; and playing the recording of the returned signal to the subscriber.

10. In a messaging system providing voice messaging services to a subscriber, a method for providing delivery verification information when a message is to be delivered to a nonsubscriber, the method comprising the steps of:

dialing a telephone number associated with the nonsubscriber;

recording a signal returned after dialing wherein the recording begins essentially immediately after the dialing; and creating a composite message comprising the recording of the returned signal and the message to be delivered; and storing the composite message in a mailbox associated with the subscriber.

11. The method of claim 10, wherein the composite message further comprises one from a group of a delivery phrase and a nondelivery phrase.

12. The method of claim 10, further comprising the step of playing the composite message to the subscriber.

13. A computer-readable medium storing program instructions for causing a computer-controlled messaging system that provides voice messaging services to a subscriber to perform the following steps when a message is to be delivered to a nonsubscriber:

dialing a telephone number associated with the nonsubscriber;

recording a signal returned after dialing wherein the recording begins essentially immediately after the dialing; and storing the recording of the returned signal in a mailbox associated with the subscriber.

14. The computer-readable medium of claim 13, further storing program instructions for causing the computer-controlled messaging system to perform the step of storing one from a group of a delivery notification and a nondelivery notification in the mailbox.

15. The computer-readable medium of claim 13, further storing program instructions for causing the computer-controlled messaging system to perform the step of determining whether the returned signal corresponds to one from a group of a voice signal, a busy signal, and a ringback signal.

16. The computer-readable medium of claim 13, further storing program instructions for causing the computer-controlled messaging system to perform the step of playing the recording of the returned signal to the subscriber.

17. A messaging system providing message delivery verification when a message generated by a messaging system subscriber is to be delivered to a nonsubscriber, the system comprising:

telephony interface circuitry coupled to a telephone system switch;

a processing unit coupled to the telephony interface circuitry; and a memory coupled to the processing unit, the memory comprising a verifying non-user outcall unit that directs recording of a signal returned after dialing a telephone number associated with the nonsubscriber, wherein the recording begins essentially immediately after the dialing.

18. The system of claim 17, wherein the memory further comprises a verifying message inquiry unit that selectively controls playback of the recording of the returned signal to the subscriber.

19. In a messaging system providing voice messaging services to a subscriber, a method for providing delivery verification information when a message is to be delivered to a nonsubscriber, the method comprising the steps of:

dialing a telephone number associated with the nonsubscriber to place a call on a telephone line;

recording a signal returned on the telephone line after dialing and before the call is answered; and storing the recording of the returned signal in a mailbox associated with the subscriber.

20. The method of claim 19, wherein the recording includes recording a signal returned on the telephone line when the call is answered.

21. In a messaging system providing voice messaging services to a subscriber, a method for providing delivery verification information when a message is to be delivered to a nonsubscriber, the method comprising the steps of:

dialing a telephone number associated with the nonsubscriber to place a call on a telephone line;

recording a signal returned on the telephone line after dialing and before the call is answered; and creating a composite message comprising the recording of the returned signal and the message to be delivered; and storing the composite message in a mailbox associated with the subscriber.

22. The method of claim 21, wherein the recording includes recording a signal returned on the telephone line when the call is answered.

23. A computer-readable medium storing program instructions for causing a computer-controlled messaging system that provides voice messaging services to a subscriber to perform the following steps when a message is to be delivered to a nonsubscriber:

dialing a telephone number associated with the nonsubscriber to place a call on a telephone line;

recording a signal returned on the telephone line after dialing and before the call is answered; and storing the recording of the returned signal in a mailbox associated with the subscriber.

24. The computer-readable medium of claim 23, further storing program instructions for causing the computer-controlled messaging system to perform the step recording a signal returned on the telephone line when the call is answered.

25. A messaging system providing message delivery verification when a message generated by a messaging system subscriber is to be delivered to a nonsubscriber, the system comprising:

telephony interface circuitry coupled to a telephone system switch;

a processing unit coupled to the telephony interface circuitry; and a memory coupled to the processing unit, the memory comprising a verifying non-user outcall unit that directs dialing a telephone number associated with the nonsubscriber in order to place a call on a telephone line and also directs recording of a signal returned on the telephone line after dialing and before the call is answered.

26. The system of claim 25, wherein the verifying non-user outcall unit further directs recording of a signal returned on the telephone line when the call is answered.

* * * * *